(12) United States Patent
Van Den Brink et al.

(10) Patent No.: US 6,435,522 B1
(45) Date of Patent: Aug. 20, 2002

(54) TILTING VEHICLE

(75) Inventors: Christopher Ralph Van Den Brink, Puttershoek; Hendrik Marinus Kroonen, Zwijndrecht, both of (NL)

(73) Assignee: Brinks Westmaas B.V. (NL)

( * ) Notice: Subject to any disclaimer, the term of this patent is extended or adjusted under 35 U.S.C. 154(b) by 0 days.

(21) Appl. No.: 09/554,322

(22) PCT Filed: Nov. 10, 1998

(86) PCT No.: PCT/NL98/00650
§ 371 (c)(1),
(2), (4) Date: Jun. 22, 2000

(87) PCT Pub. No.: WO99/24308
PCT Pub. Date: May 20, 1999

(30) Foreign Application Priority Data

Nov. 12, 1997 (NL) .............................................. 1007532

(51) Int. Cl.⁷ .............................. B62D 9/02; B62D 61/08
(52) U.S. Cl. .............................. 280/5.509; 280/124.103; 180/210; 180/403; 180/421
(58) Field of Search .................. 280/5.509, 5.51, 280/124.103, 92, 93.505; 180/120, 215, 403, 421

(56) References Cited

U.S. PATENT DOCUMENTS 4,546,997 A * 10/1985 Smyers .................... 280/5.509
4,660,853 A * 4/1987 Jephcott ................. 280/5.509

FOREIGN PATENT DOCUMENTS

FR 2 646 379 * 11/1990
WO WO 95/34459 12/1995

* cited by examiner

Primary Examiner—Peter C. English

(57) ABSTRACT

A vehicle (1) provided with a frame having two frame sections (3,4) which are able to tilt with respect to one another. An opposite steer power transmitter (50) is connected to a steerable front wheel (13). The opposite steer power transmitter (50) is controlled as a function of the tilting moment on the frame sections (3,4). By this means, application of opposite steer is achieved, as a result of which the tilting section of the vehicle "drops into the bend" more rapidly and as a result of which increased maneuvrability is obtained. The opposite steer power transmitter (50) can be used on vehicles having an active tilting system with, for example, hydraulic tilting cylinders (9,9'), which are controlled by a sensor depending on the radius of the bend (24). The tilting moment generated by the tilting cylinders (9,9') can optionally serve as a control signal for the opposite steer power transmitter (50).

6 Claims, 3 Drawing Sheets

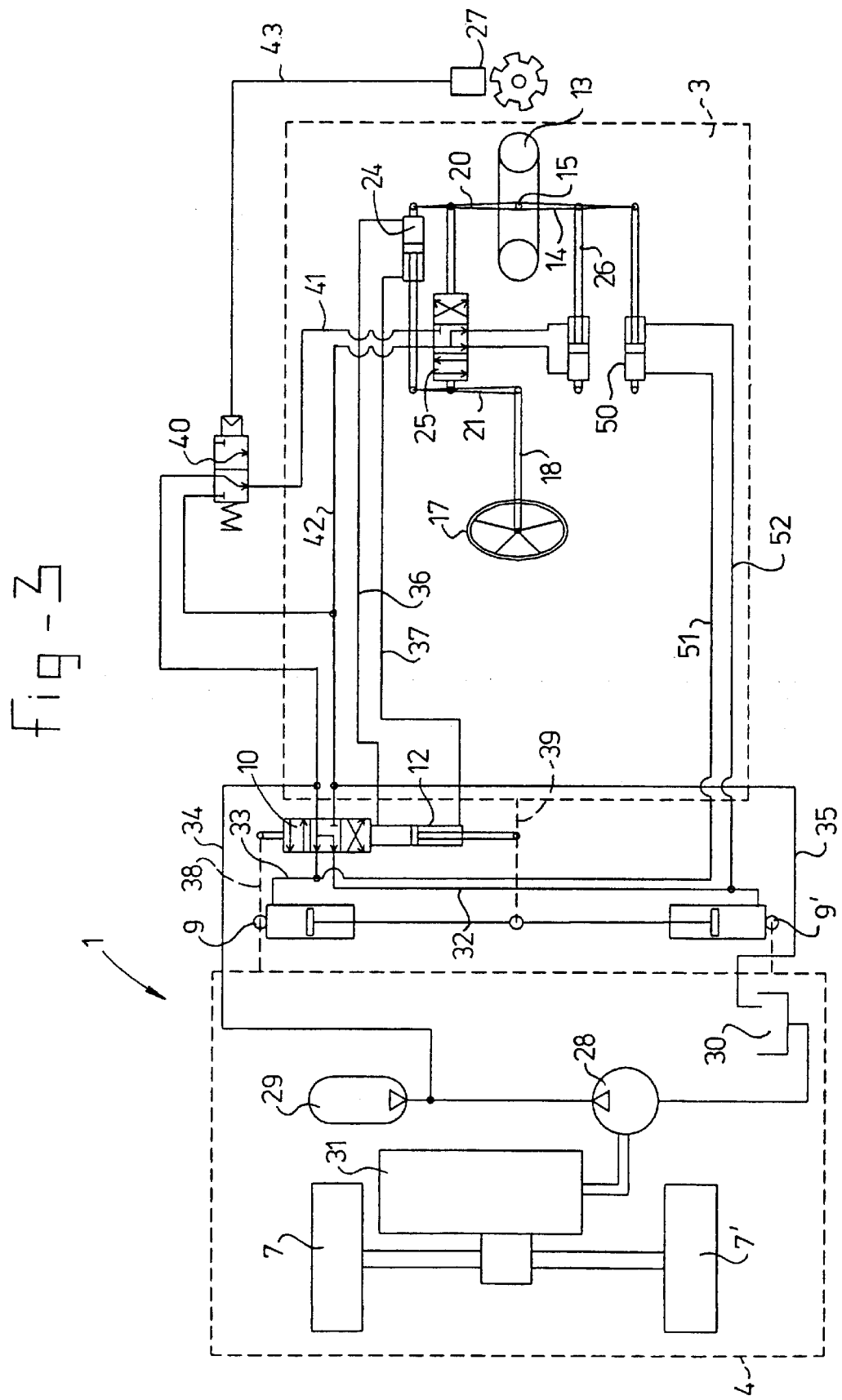

TILTING VEHICLE

BACKGROUND OF THE INVENTION

The invention relates to a vehicle provided with
at least three wheels,
a frame having a first frame section and a second frame section, the frame sections being tiltable with respect to one another about a tilt axis located in a longitudinal direction,
at least one front wheel which is connected to the first frame section and is rotatable about a front wheel steering shaft,
a steering wheel rotatably connected to the first frame section,
tilting means for tilting the first and the second frame sections relative to one another, and
a signal transmitter coupled to the tilting means in order, when driving round a bend having a predetermined bend radius, to generate a control signal for controlling the tilting means as a function of said bend radius.

A vehicle of this type is disclosed in WO 95/34459. This publication describes a self-balancing, preferably three-wheel vehicle having an active tilting mechanism, wherein the front frame section is tilted by means of hydraulic tilting cylinders when driving round a bend. In order to control the degree of tilt, the force or the moment on the front wheel is measured by a sensor, which in this case consists of a hydraulic rotary valve. In response to the signal from the sensor, the front frame section, which includes the driver's cab and the steering wheel, is tilted until the force or the moment on the front wheel becomes virtually zero. In this way a self-stabilising tilting mechanism is obtained which makes the vehicle stable when taking a bend at any speed. Since narrow vehicles as described in WO 95/34459 in general have too low a lateral stability and manoeuvrability to be able to participate in normal (car) traffic, a tilting system of this type increases the stability such that a narrow vehicle of this type can be a satisfactory means of transport. The tilting system described is fully automatic, as a result of which the driver is not expected to have any special skills for steering the vehicle. The known system provides a safe vehicle with a predictable response in all driving conditions to be anticipated.

When the driver turns into a sharp bend rapidly by exerting a moment on the steering wheel, a moment directed towards the inside of the bend will have to be exerted on the tiltable frame section in order to provide the desired tilting. The tiltable frame section will tend to tilt towards the outside, which tendency has to be counteracted by the tilting cylinders. Especially in the case of rapid manoeuvres in which the driver pulls hard on the steering wheel, the front wheel will be turned into the bend to a considerable extent and the moment on the tilting frame section which is directed towards the outside of the bend will be high, so that the tilting cylinders will have to exert a high moment in order to provide the desired tilting. As a result of this the maximum tilting speed is restricted.

SUMMARY OF THE INVENTION

It is therefore an aim of the present invention to provide a tiltable vehicle of improved manoeuvrability. In addition to an increase in the tilting speed, it is also an aim of the invention to provide a vehicle with which tilting means can be of relatively compact construction.

To this end the vehicle according to the present invention is characterised in that the tilting means comprise an opposite steer power transmitter which is connected to the front wheel and to the frame, which opposite steer power transmitter exerts a moment on the front wheel that is directed away from the center of curvature of the bend. By means of the power transmitter according to the present invention, an active front wheel servomechanism is created which compensates for the moment which is exerted by the driver on the front wheel and produces slight turning of the front wheel towards the outside. As a result, the front frame section of the tilting vehicle will "drop into the bend" more rapidly and the moments which have to be exerted by the tilting means on the front frame section in order to cause this to tilt are substantially reduced. If the power transmitter according to the invention is used in a tilting vehicle having an active tilting mechanism, that is to say where, when taking a bend, the front frame section is tilted with respect to the rear frame section by means of a separate drive device, the drive device to produce the tilting can be of relatively small construction as a result of the use of the opposite steer power transmitter. If the drive device comprises hydraulic cylinders, said cylinders can be small and/or operate at lower pressure.

The opposite steer power transmitter according to the present invention can, however, also be used in vehicles without an active tilting mechanism, tilting being produced solely by the power transmitter.

The vehicle according to the present invention can have a tiltable frame which is as described in WO 95/34459 and which is provided with three or four wheels, or can comprise a tiltable frame as described in Netherlands Patent Application number 1 005 894. Furthermore, the vehicle according to the invention can include tiltable elements in the wheel suspension, wherein the first frame section is made up of the wheel axles and the second frame section is made up of the parts supported by the wheel axles, such as, for example, the driver's cab. In this case the wheel axles can remain in a constant position when the second frame section is tilted with respect to the road surface.

The invention is based on the insight that there are two ways of changing the degree of tilt of a vehicle: 1. by exerting a tilting moment, as a result of which the vehicle is actively tilted towards the inside of the bend, and 2. by a steering manoeuvre on the front wheels in the opposite direction to the desired tilt direction, as a result of which the vehicle will tend to lean towards the inside of the bend like a motorbike.

The use of the first method alone has the disadvantage that the tilting moment that can be exerted is restricted by the characteristics (width, mass of the tiltable frame section with respect to the fixed frame section) of the vehicle, as a result of which the achievable tilting speed (and thus the manoeuvrability) are limited. Moreover, a steering moment (towards the inside of the bend) exerted by the driver will cause the tiltable frame section to lean towards the outside, as a result of which part of the available tilting moment will already be used to prevent the tiltable frame section from dropping down further towards the outside. As a consequence the maximum tilting speed is reduced, possibly even to zero.

This can be improved by the opposite steer power transmitter according to the invention, which is connected to the front wheel/the front wheels and the frame section to which the front wheels are attached. Depending on the layout of the vehicle, said section does not have to be the tilting frame section. Said opposite steer power transmitter preferably exerts a steering moment on the front wheel(s) which is a function of (for example proportional to) and in the opposing direction to the tilting moment exerted between the tilting and the non-tilting frame section of the vehicle.

As a result of said steering moment on the front wheels, specifically directed towards the outside of the desired bend, the vehicle will tilt towards the inside more rapidly than in the absence of said power transmitter. In combination with an active tilting system, the maximum tilting speed of the vehicle will be appreciably increased. The steering moment that is exerted by the power transmitter is preferably proportional to the tilting moment and will decrease as the position comes closer to the desired tilt position.

Preferably, the vehicle according to the present invention has an active tilting mechanism in the form of a drive device which is connected to the first and the second frame section in order to exert a tilting moment between the first and the second frame section. With this arrangement the signal transmitter for controlling the opposite steer power transmitter can, in a preferred embodiment, be incorporated in said drive device, so that the tilting moment that is exerted on the tilting frame section is used as a control signal for the opposite steer power transmitter. The absence of a tilting moment on the frame sections means that the vehicle is in the correct tilt position when taking a bend and that the opposite steer power transmitter does not have to be activated. If there is a tilting moment on the front and rear frame sections, this means that the tilt position has to be modified when taking the bend and specifically has to be modified in the direction of the tilting moment. Said tilting of the frame sections can be effected both by the drive device and by the opposite steer power transmitter. When the opposite steer power transmitter is controlled by the tilting moment between the frame sections, the amplification factor is not critical: if the amplification factor is low, little opposite steer will be produced by the opposite steer power transmitter and the vehicle will tilt largely as a consequence of the active tilting produced by the drive device. If the amplification factor is very high, the front wheel will apply a large amount of opposite steer because of the opposite steer power transmitter, so that tilting of the vehicle will be produced mainly by application of said opposite steer and to a lesser degree by the action of the drive device. The front wheel will, however, never apply too great an opposite steer since in that case the vehicle would lean too far into the bend, with the result that the tilting moment on the frame sections would become negative and the operation of the opposite steer power transmitter, and consequently the application of opposite steer by the front wheel, would be terminated immediately.

Irrespective of the way in which the driver's input is translated into a tilt position and driving direction, it is possible to construct the signal transmitter for the opposite steer power transmitter as, for example, a "lateral acceleration sensor" which is mounted in the tilting frame section. Said sensor measures the error in the position of the tilting frame section. By using this signal to control the opposite steer power transmitter, the latter will actively steer the front wheel and reduce the error in the tilt position to zero. As a consequence the primary tilting system can be of simpler and more compact construction. Additional safety can also be built in by this means, for example by triggering a fitted emergency system or warning signal if a specific tilt position error angle is exceeded. In this case the signal from the acceleration sensor is a suitable input signal for the opposite steer power transmitter with an amplification factor to be chosen.

Any system can be used to control the drive device for active tilting of the frame sections, for example the system as described in EP-A 0 592 377. With this system the drive device for tilting the front frame section relative to the rear frame section, which carries the drive, is obtained by angular rotation of the front wheel about the front wheel axle with respect to the frame. EP-A 0 020 835 describes a tilting vehicle wherein the drive device for tilting the frame sections is controlled by means of foot pedals or by a movement of the steering column, transversely to the axis of rotation thereof. Preferably, however, the drive device is controlled by a sensor which generates a signal that is dependent on the force or moment exerted on the front wheel. This type of control of the drive device is described in WO 95/34459. In a further preferred embodiment, the steering wheel is connected via a steering shaft to the first frame section, the steering shaft being rotatable with respect to the front wheel about its center line. The drive device is controlled by a turning angle sensor which measures an angle of rotation between the front wheel and the steering shaft. A construction of this type is described in International Patent Application number PCT/NL98/00534.

BRIEF DESCRIPTION OF THE DRAWINGS

One embodiment of a tilting vehicle according to the present invention will be described in more detail with reference to the appended drawing.

In the drawing:

FIG. 3 shows a hydraulic diagram for the vehicle according to FIGS. 1 and 2.

DESCRIPTION OF THE PREFERRED EMBODIMENTS

Figure 1:
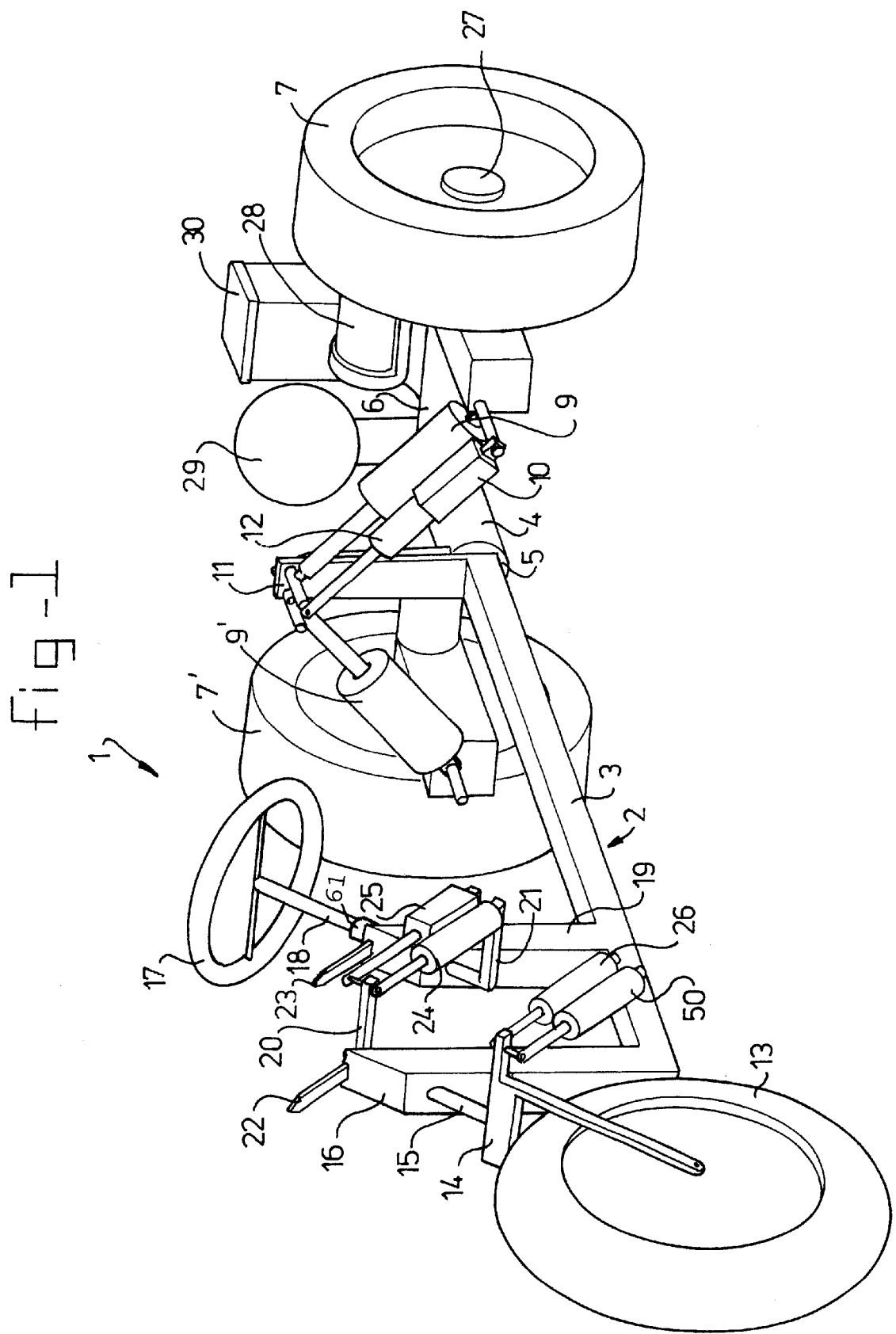
FIG. 1 shows a diagrammatic perspective view of a vehicle according to the present invention when driving in a straight line.

FIG. 1 shows a vehicle 1 having a frame 2. The frame 2 comprises a front frame section 3 and a rear frame section 4. The frame sections 3 and 4 are rotatably joined to one another at a point of rotation 5. The rear frame section 4 is provided with a rear axle 6 with two rear wheels 7,7'. The drive device for active tilting of the front frame section 3 comprises tilting cylinders 9,9', which are connected via a piston rod to a fixing plate 11 on the front frame section 3. The cylinders 9,9' are connected by their second end to the rear frame section 4. The cylinders 9,9' may be pneumatic or hydraulic cylinders. A gate valve 10, which is driven by a cylinder 12, is mounted parallel to tilt cylinder 9 between the rear frame section 4 and the front frame section 3. The rear frame section 4 also supports drive means, such as an internal combustion engine or electric motor, for propulsion of the vehicle 1. For the sake of clarity, this drive is not shown in the figures.

The front frame section 3 bears the front wheel 13, which, via the front fork 14 and the front wheel steering shaft 15, is rotatably supported in bearings in a front support 16. A steering wheel 17 is attached via the steering shaft 18 to a second support 19 of the front frame section 3. The steering shaft 18 can be turned via the steering wheel 17 independently of the front wheel 13 in the bearing of the second support 19. A power transmitter, such as a torsion spring 61, is connected to the steering shaft 18 in order to exert restoring force on the steering wheel 17 which increases with increasing angular rotation of the steering wheel 17.

Transverse arms 20 and 21 are attached to the end of the front wheel steering shaft 15 and of the steering shaft 18 respectively, the free end of which transverse arms are connected to a respective part of the turning angle sensor 24, which in the embodiment shown consists of a hydraulic cylinder. In FIG. 1 the angular positions of the front wheel 13 and of the steering wheel 17 are indicated by diagrammatic angular position indicators 22 and 23, which are solely illustrative and will not be present in the final embodiment of a vehicle according to the invention. A power steering valve 25, the respective ends of which are attached to the transverse arms 20 and 21, is accommodated parallel to the turning angle sensor 24.

Finally, the front fork 14 is attached via a transverse arm to a power steering cylinder 26, the other end of which is attached to the front frame section 3.

The front frame section 3 also supports a driver's seat and driver's cab, which for the sake of clarity have been omitted in the figure shown.

The rear frame section 4 also comprises an oil pump 28, an accumulator 29 and a reservoir 30 for the hydraulic pressure medium. The tilting cylinders 9 and 9' and the power steering cylinder 26 are driven by the oil pump 28. Finally, a speed sensor 27 is connected to the rear axle 6 or front wheel 13 to provide speed-dependent activation and deactivation of the power steering cylinder 26.

The components of the vehicle according to the invention which have been described above form part of the active tilting system that causes the front frame section 3 to tilt relative to the rear frame section 4 when taking a bend. The functioning thereof will be explained in detail below.

Figure 2:
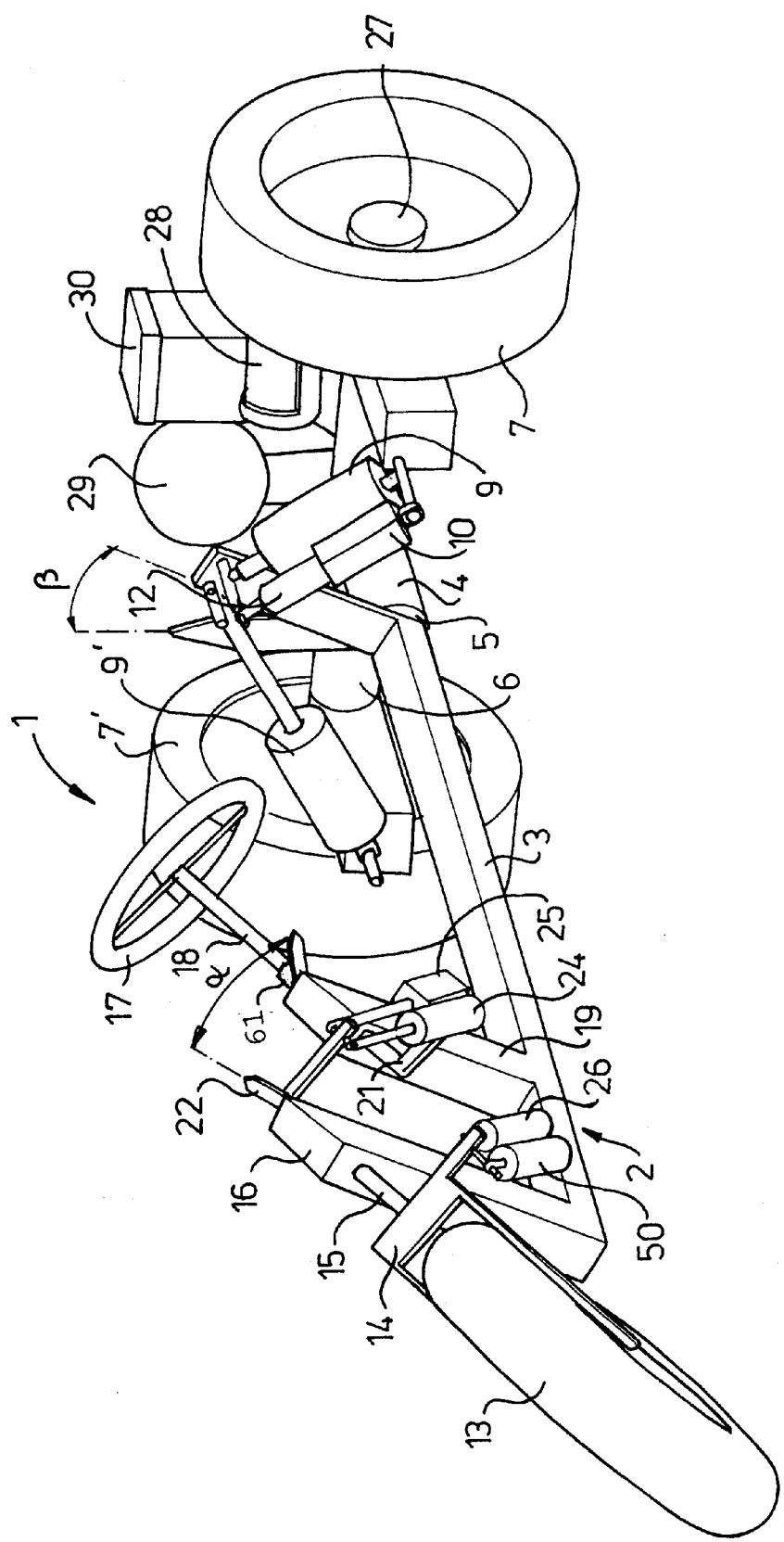
FIG. 2 shows a perspective view of the vehicle according to FIG. 1 in the tilted position.

The vehicle as shown in FIGS. 1 and 2 also comprises tilting means in the form of an opposite steer power transmitter 50 which on one side is connected to the front fork 14 and on the other side is connected to the front frame section 3. By means of the opposite steer power transmitter 50, which is controlled by the moment that is exerted by the tilting cylinders 9, 9', as will be explained in more detail below, when taking a bend the front wheel 13 is rotated away from the center of curvature of the bend, so that tilting of the front frame section 3 towards the center of curvature of the bend is obtained as a result. The mode of operation of the active tilting mechanism by means of the tilting cylinders 9,9' is as follows: in the straight position shown in FIG. 1 the angle $\alpha$ between the steering shaft 18 and the front wheel steering shaft 15 is 0°, so that the turning angle indicators 22 and 23 are parallel to one another. The turning angle sensor 24 and the cylinder 12 of the gate valve 10 are hydraulically coupled to one another. Movement of sensor 24 causes movement of follower cylinder 12, as a result of which gate valve 10 moves. As a result gate valve 10 opens, a pressure difference is produced on the tilting cylinders 9,9' and the tilting section starts to move. As a result, gate valve 10 moves back to the mid position and when this is reached the pressure difference between tilting cylinders 9,9' disappears and the tilting movement stops. Each position of the turning angle sensor 24 leads to a specific position of cylinder 12 and thus of the tilting frame. The slight turning of the front wheel will hardly be noticed by the driver and will be corrected subconsciously by a small steering correction.

When the steering wheel 17 is turned from the straight driving position until the turning angle indicator 23 makes an angle with respect to the turning angle indicator 22, the turning angle indicator 22 initially remains in the straight ahead position as a result of the inertia and other dynamic characteristics of the front wheel 13. Tilting cylinders 9,9' are activated by the turning angle sensor 24, so that a pre-determined tilting of the front frame section 3 relative to the rear frame section 4 takes place. Depending on the degree of tilt of the front frame section 3, the front wheel 13 will turn in a little, depending on the vehicle's speed, until an angle a is obtained between the front wheel 13 and the steering wheel 17, as indicated in FIG. 2. The tilt angle will finally be $\beta$°. In FIG. 2 $\alpha$ is determined by the diagrammatic turning angle indicators 22 and 23. The angular rotation of the steering wheel 17 is thus translated partly into the tilt angle $\beta$ and partly into a front wheel angle, both of which assume the ideal relationship during any driving speed.

The value $\alpha$ measured by the turning angle sensor 24 is equal to the steering angle of the steering shaft 18 minus the angular rotation of the front wheel steering shaft 15. The angle $\alpha$ is used to control the tilt angle $\beta$ of the vehicle in accordance with the equation $\beta=f(\alpha)$. The tilt angle $\beta$ is determined entirely by the steering measurement $\alpha$. Both the turn of the steering wheel 17 with respect to the front wheel 13 (the range in degrees of the steering measurement $\alpha$) and the translation of the steering measurement $\alpha$ into the tilt angle $\beta$ can be chosen such that optimum driving feel is obtained. For example, it is possible to choose $\beta=c\times\alpha$ where c is constant.

FIG. 3 shows, diagrammatically, the hydraulic system of the vehicle 1 according to the present invention. In FIG. 3 the front frame section 3 and the rear frame section 4 are indicated by rectangles shown in broken lines. Furthermore, in FIG. 3 the same reference numerals are used as in FIGS. 1 and 2 for the same components. As can be seen from FIG. 3, the oil pump 28 is driven by the engine 31 of the vehicle 1. In this case, the engine 31 can be an electric motor or an internal combustion engine. However, it is also possible to drive the oil pump 28 by a separate motor which is fitted in the front frame section 3.

The accumulator 29 is located on the pressure side of the oil pump 28. Via the 4/3 gate valve 10, the tilting cylinders 9, 9' can be connected by their respective lines 32, 33 to the high pressure line 34 which is connected to the accumulator 29 or to the return line 35 which opens into the reservoir 30. The gate valve 10 is operated by the cylinder 12, which is coupled via lines 36 and 37 to the turning angle sensor 24. The cylinder 24 is connected on one side to the transverse arm 20 of the front wheel steering shaft 15, whilst the piston rod of the cylinder 24 is connected to the transverse arm 21 of the steering shaft 18. The piston of the cylinder 24 is moved depending on the relative angular rotation between the steering shaft 18 and the front wheel steering shaft 15 ($\alpha$). This turn is followed by the cylinder 12. In the upright position shown, where the angle $\alpha$ is 0°, both tilting cylinders 9, 9' are connected to the high pressure line 34, so that the front frame section is upright. On steering movement of the steering wheel anti-clockwise (seen from the driver's position), the piston will move to the left in the cylinder 24. As a result the piston in the cylinder 12 will be pushed towards the valve 10 and the right tilt cylinder 9' will be connected to the high pressure line 34. The left tilt cylinder 9 will be connected to the return line 35. The valve 10 and the cylinder 12 are connected on one side to the rear frame section 4, which is indicated diagrammatically by the broken line 38, and on the other side are connected to the front frame section 3, shown diagrammatically by the broken line 39. As a result, on tilting to the left, the cylinder 12 will be moved away from the valve 10, so that the valve 10 assumes the mid position again and the movement of the piston rods of the tilting cylinder 9, 9' which piston rods are coupled to one another ,is stopped.

In FIG. 3 the opposite steer power transmitter 50 according to the invention is formed by the double-acting cylinder 50, the piston rod of which is connected to the arm of the front fork 14 of the front wheel 13. The housing of the cylinder 50 is attached to the front frame section 3. A line 51 is connected between the tilt cylinder 9 and the valve 10 to the line 33 of tilt cylinder 9. A line 52 is connected between the tilt cylinder 9' and the valve 10 to the line 32 of cylinder 9'. The signal transmitter for the opposite steer power transmitter 50 is in this case thus formed by the tilting cylinders 9, 9'.

If the driver turns the steering wheel to the left, the valve 10 will be moved such that tilt cylinder 9' is connected to the high pressure line 34 and tilt cylinder 9 is connected to the pressure return line 35. As a result the line 52 of cylinder 50 will likewise be connected to the high pressure line 34 and the line 51 will be connected to the pressure return line 35. As a result the piston in the cylinder 50 will move to the left and the front wheel 13 will be turned to the right. As a result, the front frame section 3 will tend to "drop into the bend" to the left, seen from the driver's position, and the moments to be exerted by the tilting cylinders 9, 9' will be restricted.

FIG. 3 also shows the speed-dependent power steering by means of the power steering cylinder 26, which is connected via the 4/3 power steering valve 25 to a switching valve 40. The switching valve 40 is operated by a speed sensor 27, for example in the form of a gear pump. In the situation shown the speed of vehicle 1 is insufficient to cause the pump 27 to move the valve 40 against the spring pressure. At the low speed the valve 40 is switched such that the line 41 of the valve 25 is connected to high pressure line 34. The line 42 is always connected to the return line 35. On turning the steering wheel a pressure difference will be built up over the piston of the cylinder 26 by opening of the valve 25, as a result of which turning of the front wheel 13 is obtained. When the vehicle speed increases the pressure in the switching line 43 will increase sufficiently to switch over valve 40, so that both lines 41 and 42 are connected to the return line 35. Smooth deactivation of the power steering can be obtained by not instantly switching line 41 from high pressure 30 to the return line but allowing the pressure to decrease gradually (for example by means of a pressure control valve which is controlled by the speed sensor). The power steering cylinder 26 is deactivated in this way. By engaging the power steering at low speeds, the front wheel 13 will follow the steering wheel movements when the steering wheel 17 is turned, so that the angle a remains virtually equal to 0°. As a result, tilting of the vehicle is prevented. A certain free turn of α, for example+1°, remains possible.

Although in the embodiments described above the sensor 24 is of hydraulic construction, the invention is not restricted to this and optical, electrical or mechanical sensors can also be used for controlling the tilting cylinders. In principle, the hydraulics of the tilting cylinders can also be replaced by any other system, such as, for example, an electrical system. Furthermore the present invention is not restricted to vehicles having a front tilting section having one wheel and a rear, stationary section having two wheels, but it is possible for the front frame section to have two wheels and not to be of tilting construction, whilst the rear frame section is able to tilt and has one wheel, or it is possible to use a four-wheeled frame as is described in Netherlands Patent Application number 1 005 894. It can also be employed in a three-wheeled or multiple wheeled vehicle where one frame section is made up of the wheel suspension.

Finally, the opposite steer power transmitter 50 can also be used in vehicles which are tiltable without an active drive in the form of tilting means 9,9' and it can also be used in tilting vehicles with an electronic construction, such as, for example, of the Citroën Activa or Mercedes Life Jet type.

What is claimed is:

1. A vehicle (1) provided with
    at least three wheels (7,7',13),
    a frame having a first frame section (3) and a second frame section (4), the frame sections being tiltable with respect to one another about a tilt axis located in a longitudinal direction,
    the wheels including at least one front wheel (13) which is connected to the first frame section (3) and is rotatable about a front wheel steering shaft (15),
    a steerng wheel (17) rotatably connected to the first frame section (3),
    tilting means for tilting the first and the second frame sections relative to one another, the tilting means including a signal transmitter that, when driving round a bend having a bend radius, controls the tilting means as a function of the bend radius, and an opposite steer power transmitter (50) which is connected to the front wheel (13), to the signal transmitter, and to the frame, the opposite steer power transmitter (50) exerting a moment on the front wheel (13) that is directed away from the center of curvature of the bend.

2. Vehicle according to claim 1, wherein the signal transmitter generates a control signal that is a function of the moment between the first and the second frame section (3,4).

3. Vehicle according to claim 1, wherein the tilting means has a drive device (9,9') which is connected to the first and the second frame section (3,4) to exert a tilting moment on the first and the second frame section.

4. Vehicle according to claim 3, wherein the drive device comprises one or more cylinders (9,9') which are connected via a valve (10) to a pressure source (29), wherein the opposite steer power transmitter (50) comprises a double-acting cylinder which is connected between the valve (10) and the one or more cylinders (9,9').

5. Vehicle according to claim 3, wherein the drive device (9,9') is controlled by a sensor which generates a signal that is dependent on the force or moment exerted on the front wheel.

6. Vehicle according to claim 3, wherein the steering wheel (17) is connected via a steering shaft (18) to the first frame section (3), wherein the steering shaft (18) is rotatable relative to the front wheel (13), the drive device (9,9') being controlled by a turning angle sensor (24) which measures an angle of rotation between the front wheel (13) and the steering shaft (18).

* * * * *